Figure 1:
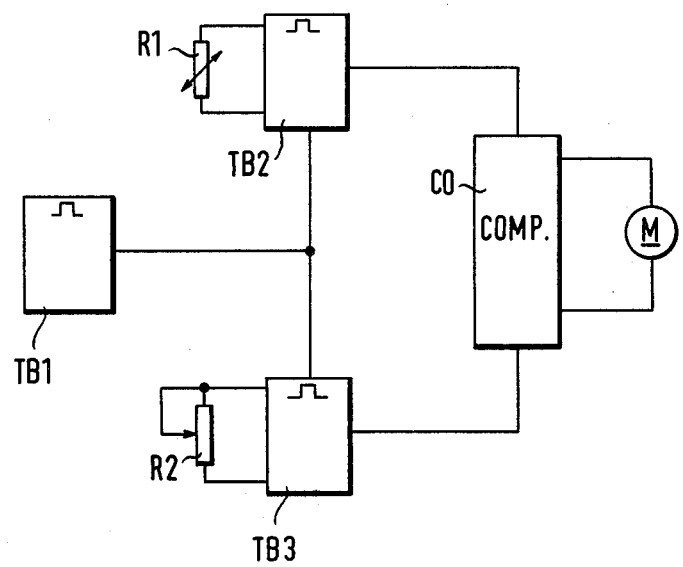

United States Patent [19]

Rossi et al.

[11] 4,406,322
[45] Sep. 27, 1983

[54] HEATING AND/OR COOLING SYSTEM

[75] Inventors: Guglielmo Rossi, Linkenheim; Ursula Eysholdt, Hockenheim; Gerd Müller, Büschfeld, all of Fed. Rep. of Germany

[73] Assignee: Ranco Incorporated, Dublin, Ohio

[21] Appl. No.: 150,920

[22] Filed: May 19, 1980

[30] Foreign Application Priority Data

May 22, 1979 [DE] Fed. Rep. of Germany ....... 2920717

[51] Int. Cl.³ .......................... F25B 29/00; B60H 3/00
[52] U.S. Cl. ....................................... 165/14; 236/13; 237/2 A; 165/42
[58] Field of Search .......................... 236/12, 13, 46 F; 237/12.3 B, 12.3 A; 165/14, 27, 42; 318/599

[56] References Cited

FOREIGN PATENT DOCUMENTS

| 2364358 | 6/1975 | Fed. Rep. of Germany | 236/12 |
| 1498832 | 9/1967 | France | 236/12 |
| 2318450 | 2/1977 | France | 236/12 |
| 1397072 | 6/1975 | United Kingdom | 236/12 |

OTHER PUBLICATIONS

Friedland, B., Modeling Linear Systems for Pluse Width-Modulated Control, Oct. 1976, IEEE, pp. 739-746.

*Primary Examiner*—Albert J. Makay
*Assistant Examiner*—Henry Bennett
*Attorney, Agent, or Firm*—Watts, Hoffmann, Fisher & Heinke

[57] ABSTRACT

In a heating and/or cooling system, two heat transmitting media are blended into a blended medium with adjustable temperature. The motor (M) of a blending member is controlled pulsewise in both directions by comparison pulses from a setpoint/actual value temperature comparison.

In order to provide a system which is simple to construct, which is wear-resistant and which permits a quick and accurate adjustment of the blending member, the circuit arrangement for controlling the motor (M) contains a first pulse generator (TB1), which generates pulses of constant width commencing respectively with the end of a comparison pulse and is connected to second and third pulse generators (TB2, TB3). The second and third pulse generators (TB2, TB3) generate pulses of a width proportional to the actual value or the setpoint of the temperature, respectively, which directly control the motor (M) after comparison in a comparator (CO). The blending member is advantageously the blend door for air supply into a motor vehicle or a mixing valve for liquid media.

9 Claims, 4 Drawing Figures

HEATING AND/OR COOLING SYSTEM

The invention relates to a heating and/or cooling system, wherein two heat-transmitting media are blended by means of a motor-adjusted blending member in such a manner that the temperature of the blended medium is brought to an adjustable setpoint, the setpoint actual value comparison is performed by comparison of the pulse length of the pulses corresponding with the setpoint and actual value, and the motor of the blending member is controlled pulsewise in both directions by the comparison pulses.

In known heating and/or cooling systems, wherein two heat-transmitting media are blended by means of a motor-adjusted blending member in such a manner that the temperature of the blended medium is brought to an adjustable setpoint, setpoint and actual temperature are analogously detected and compared, and from the result of the comparison, the magnitude and sense of the voltage supplied to the motor of the blending member is determined. The setpoint detection takes place via a potentiometer, which is connected for example in the heating system of motor vehicles with the blend door for hot and cold air, and represents the weakest member of the entire system as a result of natural wear.

From the British Pat. No. 1 397 072, a heating and cooling system of the type described above has become known, wherein the air is supplied to an airplane cabin via a heat exchanger and parallel thereto via a bypass with control valve as blending member. The control valve is actuated by a stepping motor, which receives pulse width modulated pulses from a comparator amplified in an amplifier stage. Setpoint pulses are compared with actual value pulses for the cabin temperature in the comparator.

The invention is based on the object of providing a heating and/or cooling system of the type described above which is of simple construction, resistant to wear and quick and accurate in the adjustment of the blending member.

According to the invention, this object is solved in that the circuit arrangement contains for the pulsewise control of the motor of the blending member a first pulse generator which generates pulses of constant width commencing respectively with the end of a comparison pulse and is connected to a second and third pulse generator, the second pulse generator generating pulses having a width proportional to the actual temperature value and the third pulse generator generating pulses having a width proportional to the setpoint of the temperature, which pulses directly control the motor of the blending member after a comparison in a comparator, on the basis of the comparison pulses generated therefrom.

Such a system in the control no longer contains any members affected by wear, the control is quick and accurate and, moreover, takes high care of the blending member motor, as the maximum voltage supplied thereto is always the same.

The pulse generators advantageously comprise IC elements with respective connections, the IC elements of the second and third pulse generators having the same assembly.

The comparator itself is expediently constructed of an EXCLUSIVE-OR-gate and two AND-gates, which receive the setpoint and actual value pulses and deliver the comparison pulses. This provides as a whole a reliable circuit arrangement which is simple to construct and with which the direct pulsewise control of the motor is possible.

The comparison pulses are further advantageously connected respectively to the bases of transistors provided in the opposite branches of a bridge circuit, whereas the motor is disposed in the diagonals of the bridge circuit. The comparison pulses are directly converted herewith into voltage pulses of a width equal to the comparison pulses and with differing directions.

The actual value measurement of the temperature expediently takes place by means of a thermistor connected to the second pulse generator, whereas the setpoint adjustment takes place by means of a potentiometer connected to the third pulse generator.

Furthermore, a sensor for sensing the outside temperature can be provided, which is connected in addition to the actual value information to the control circuit (second pulse generator). This sensor is advantageously also a thermistor.

In an advantageous embodiment the system according to the invention is a heating and/or cooling system of a motor vehicle, wherein the blending member is the blend door for outside air and air flowing through the radiator.

Another use of the system according to the invention is as stationary heating and/or cooling system, wherein the blending member is a mixing valve for liquid media.

Figure 4:
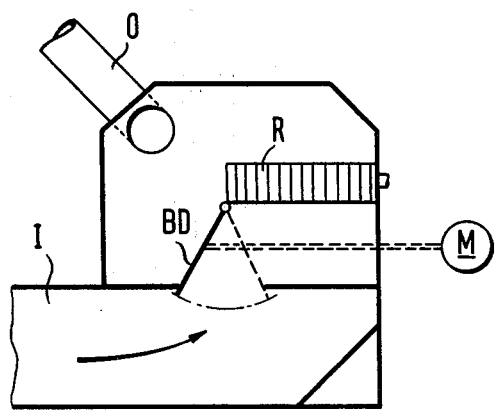

The invention is explained in more detail in the following on the basis of embodiments and drawings. In the drawings FIG. 1 shows a block diagram of a circuit arranged for controlling a heating and/or cooling system, FIG. 2 shows a circuit diagram of a circuit arrangement according to FIG. 1, FIG. 3 shows pulse diagrams of a system according to FIG. 1, and FIG. 4 shows an example of use for the system according to FIG. 1.

FIG. 1 shows the block diagram of a circuit arrangement for controlling the motor M of a blending member of a heating and/or cooling system. The control of this motor M is effected by pulses. A pulse generator TB1 provides pulses of constant width commencing respectively with the end of a comparison pulse which is generated in a comparator CO, compare in this respect also the pulse of TB1 and to CO in FIG. 3.

The pulse generator TB1 controls two further pulse generators TB2 and TB3. The pulse width of the pulses generated by the pulse generator TB2 is proportional to the actual value of the temperature measured by a temperature sensor in the form of a thermistor R1. The width of the pulses delivered by the pulse generator TB3 is proportional to the temperature setpoint adjusted in a potentiometer R2. The pulses from the pulse generator TB 2 and the pulse generator TB3 are compared with each other in the comparator CO and difference pulses or comparison pulses are generated as shown under CO in FIG. 3.

Figure 2:
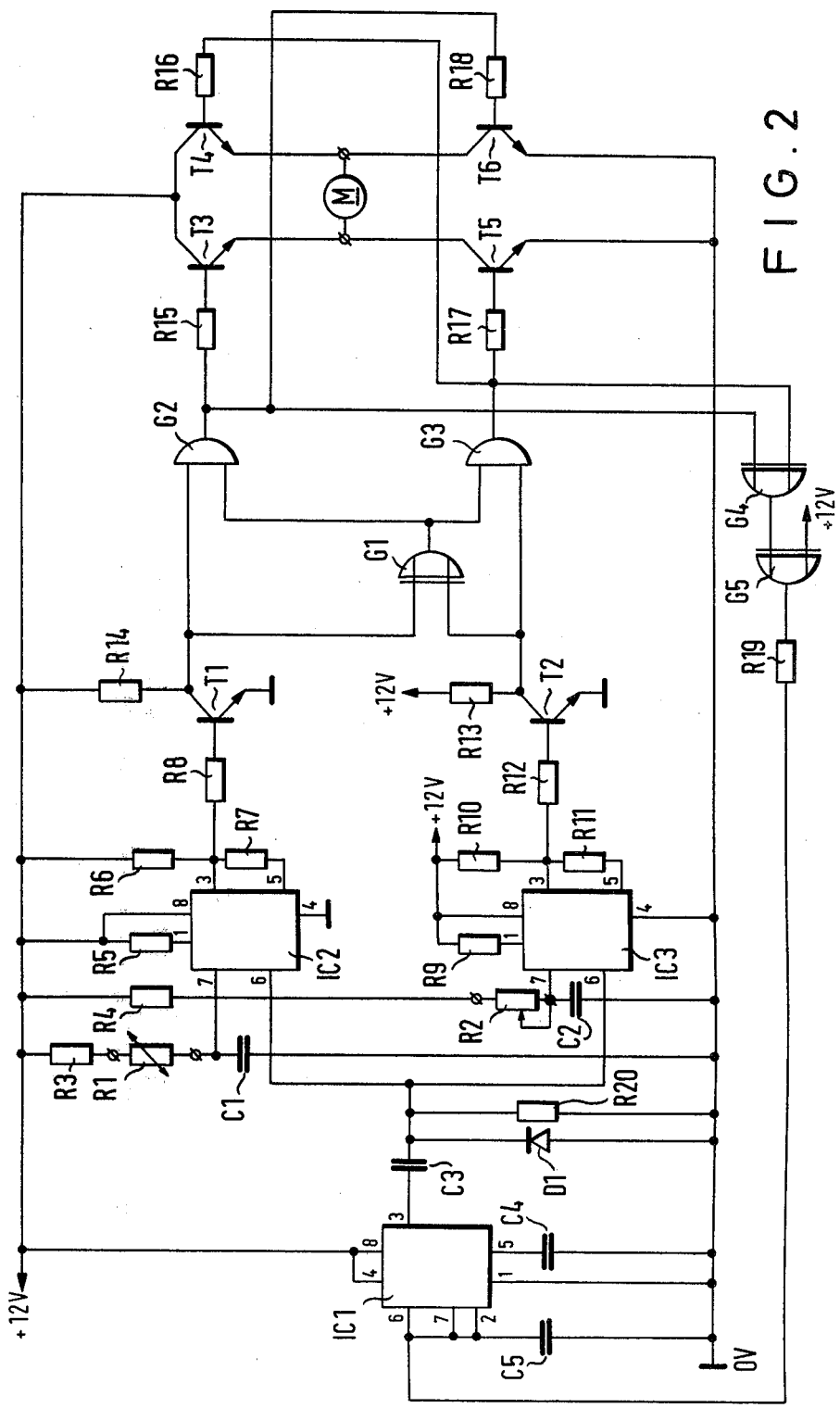
Figure 3:
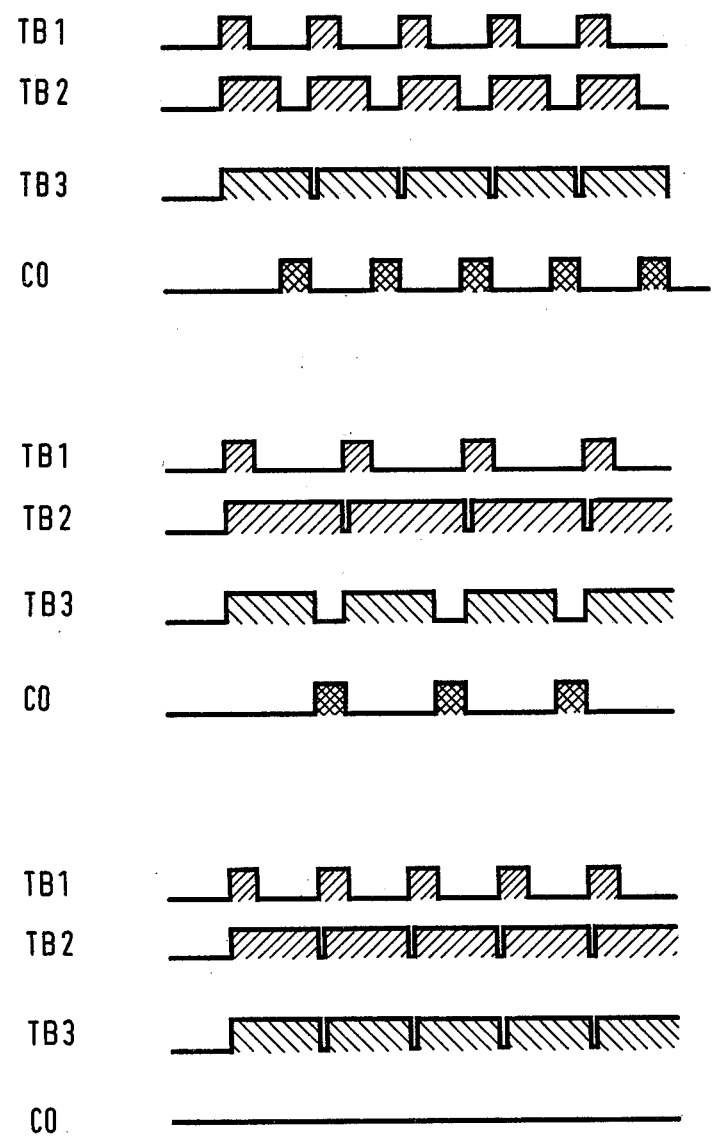

FIG. 2 shows the circuit diagram of an embodiment of a circuit arrangement according to the block diagram of FIG. 1. The pulse generator TB1 is formed of a first IC element IC1 with respective connections. The terminal 1 of the IC element IC1 is grounded, the terminals 4 and 8 are connected to the supply voltage +12V. The terminals 2,6 and 7 are combined and on the one hand are grounded via a capacitor C5 and are connected on the other hand to a resistance R19. The terminal 5 of the IC element IC1 is grounded via a capacitor C4. The terminal 3 is connected via a capacitor C3 to the terminals 6 of two further IC elements IC2 and IC3, which form the further pulse generators TB2 and TB3 together with the respective connections. Between the terminals 6 of the IC elements IC2 and IC3 and ground lies the parallel circuit of a diode D1 and a resistance R20. The IC elements IC2 and IC3 are equally formed as such and wired in a similar manner. Their terminals 7 are grounded via a capacitor C1 and a capacitor C2, respectively. The terminal 7 of the IC element IC2 is further in contact with the supply voltage 12V via a resistance R3 and a thermistor R1 which operates as temperature sensor. On the other hand the terminal 7 of the IC element IC3 is also in contact with the supply voltage 12V via a resistance R4 and via the potentiometer R2 for the setpoint adjustment. Thermistor R1 and potentiometer R2 can be easily replaced.

The terminals 4 of the IC elements IC2 and IC3 are grounded, whereas the terminals 8 are in contact with the supply voltage +12V. The terminals 1 are also in contact with the supply voltage +12V via a resistance R5 and a resistance R9, respectively. The terminals 3 and 5 are bridged via a resistance R7 and R11, respectively.

The terminal 3 of the IC element IC2 is connected via a resistance R8 to the base of a transistor T1, which lies with its emitter-collector path in series with a resistance R14 between ground and supply voltage +12V. In a similar manner, the terminal 3 of the IC element IC3 is connected via a resistance R12 to the base of a transistor T2, the emitter-collector path of which lies in series with a resistance R13 between ground and supply voltage +12V. The outputs of the transistors T1 and T2 are connected to an EXCLUSIVE-OR gate G1, the output of which is connected to an AND-gate G2 and an AND-gate G3. The output of the transistor T1 is supplied as second input to the AND-gate G2, whereas the output of the transistor T2 is supplied as second input to the AND-gate G3.

The output of the AND-gate G2 is supplied via a resistance R15 to the base of the transistors T3 lying in a bridge circuit and via a resistance R18 to the base of a transistor T6 lying in the opposite bridge branche of the bridge circuit. The output of the AND-gate G3 is supplied via a resistance R17 to the base of a transistor T5 in the same bridge circuit and via a resistance R16 to the base of a fourth transistor T4 in this bridge circuit in the opposite branch. On the one diagonal of the bridge circuit, the supply voltage lies between ground and +12V, whereas in the other diagonal the motor M for the actuation of the blending member is disposed.

The output of the AND-gate G2 is further connected to the one input of an EXCLUSIVE-OR-gate G4, to the other input of which the output of the AND-gate G3 is connected. The output of the OR-gate G4 is in contact with an input of a further EXCLUSIVE-OR-gate G5, the other input of which is in contact with the supply voltage +12V. The output of the OR-gate G5 is led to the resistance R19 and thence further to the terminal 6 of the IC element IC1.

With the circuit arrangement represented in FIG. 1 and 2, the pulse trains show in FIG. 3 are obtained according to temperature in relation to the setpoint. With a temperature exceeding the setpoint, the pulse generator TB1 provides the pulse train shown in the first line of FIG. 3, the pulse generator TB2 the pulse train shown in the second line and the pulse generator TB3 the pulse train shown in a third line. By comparison in the comparator CO, a pulse train is generated as shown in the fourth line of FIG. 3. The pulses appear in the output of the AND-gate G3 in FIG. 2 and control the transistors T4 and T5 during their duration. Thus, the motor M moves in the direction of a temperature reduction.

If the temperature lies below the setpoint, the pulses shown in the next three lines in FIG. 3 appear at the outputs of the three pulse generators TB1, TB2 and TB3. The pulses defined with CO in the further lines are in accordance with the difference between temperature pulses and setpoint pulses and appear this time at the output of the AND-gate G2. The transistors T3 and T6 are controlled thereby during the pulse duration and the motor rotates in the opposite direction.

Finally, for the case that the temperature corresponds with the setpoint, the pulses at the output of the pulse generators TB2 and TB3 (compare bottom of FIG. 3) are equal, and no comparison pulses are generated in the comparator CO. The motor M therefore stops.

The subjective temperature sensitivity is not only dependent on the absolute temperature within a room, but also on the outside temperature. In order to account for the subjective temperature sensitivity, a further temperature sensor can be provided for the outside temperature, which acts in addition to the actual value information on the control circuit, namely on the pulse generator TB2 or on the IC element IC2, respectively.

Thus, with the same setpoint, according to the outside temperature different actual values of the temperature are adjusted. Such a control can be defined as comfort level control.

An application for the heating and/or cooling system according to the invention is shown in FIG. 4. Herein the motor M controls the blending door BD of a heating and/or cooling system in a motor vehicle as blending member. Fresh air enters the system via an air channel I and according to the position of the blending door BD is further led directly to an air exit channel O, guided entirely over a radiator R (this position of the blend door BD is represented in FIG. 4 with the solidly drawn lines of the blend door) or in an intermediate position of the blend door BD is guided partly directly and partly over the radiator R. The motor M for the adjustment of the blend door BD is controlled and fed by means of the circuit shown in FIG. 2.

A further possibility of the use of the system according to the invention is a stationary heating and/or cooling system, wherein the blending member is a mixing valve for liquid medium. This mixing valve is driven via the motor M under the control of a circuit arrangement according to FIG. 2.

We claim:

1. A heating and/or cooling system, wherein two heat-transmitting media are blended by means of a motor-actuated blending member in such a manner that the temperature of the blended medium is brought to an adjustable setpoint, the setpoint and actual temperature value comparison being performed by a circuit arrangement for producing comparison pulses resulting from comparison of the pulse lengths of pulses corresponding respectively with the setpoint and the actual temperatue value, and the blending member motor being controlled pulsewise in both directions by the comparison pulses, characterized in that the circuit arrangement comprises a first pulse generator which generates pulses of constant width commencing respectively after production of a comparison pulse and is connected to a second and third pulse generator, the second pulse generator generating pulses having a width proportional to the actual temperature value and the third pulse generator generating pulses having a width proportional to the temperature setpoint, and a comparator for comparing the widths of the setpoint and actual temperature pulses and producing the comparison pulses.

2. Heating and/or cooling system according to claim 1, characterized in that the actual value measurement of the temperature is performed by means of a thermistor connected to the second pulse generator and the setpoint adjustment takes place by means of a potentiometer connected to the third pulse generator.

3. A heating and/or cooling system according to claim 1, characterized in that a sensor is provided for sensing the ambient environmental temperature, which in addition to the actual temperature value information is connected to the second pulse generator.

4. Heating and/or cooling system according to claim 3, characterized in that the sensor for the ambient environmental temperature is a thermistor.

5. Heating and/or cooling system according to claim 1, characterized in that the system is a heating and/or cooling system of a motor vehicle, wherein the blending member is the blending door for the outside air and air flowing through a radiator.

6. Heating and/or cooling system according to claim 1, characterized in that the system is a stationary heating and/or cooling system, wherein the blending member is a mixing valve for liquid media.

7. A system for proportioning the flows of heat transmitting media by a media blending member to control the temperature of the blended media, the blending member positionable by an electrically energizable actuator, the system comprising:
 (a) first circuit means for generating a pulse having a duration dependent upon the level of a desired setpoint temperature, said first circuit means generating said setpoint pulse in response to an input pulse;
 (b) second circuit means for generating a pulse having a duration depending upon the level of a sensed temperature, said second circuit means generating said temperature pulse in response to an input pulse,
 (c) comparing circuitry for comparing the pulses produced by said first and second circuit means, said comparing circuitry having inputs coupled to said first and second circuit means and outputs coupled to the actuator, said comparing circuitry effective to produce:
  (i) a first output signal for energizing the actuator to move the blending member in one direction in relation to the difference in duration of pulses from the first and second circuit means when the duration of the setpoint pulse exceeds the duration of the temperature pulse; and
  (ii) a second output signal for energizing the actuator to move the blending member oppositely to said one direction in relation to the difference in duration of pulses from the first and second circuit means when the duration of the temperature pulse exceeds the duration of the setpoint pulse, and
 (d) third circuit means for simultaneously initiating operation of the first and second circuit means, said third circuit means having its input coupled to said comparing circuitry output signals and producing an input pulse applied to the inputs of said first and second circuit means to effect generation of said setpoint and temperature pulses, said comparing circuitry effective to prevent initiation of an input pulse by said third circuit means whenever said first or second output signal is being produced.

8. The system claim in claim 7 wherein said third circuit means input is coupled to said comparing circuitry via an element which enables generation of pulses by said third circuit means in the absence of said first and second output signals.

9. A heating and/or cooling system according to claim 1, characterized in that the circuit arrangement is an electrical circuit and the pulse generators comprise IC elements with the IC elements of the second and third pulse generators having the same construction and the same connections in the circuit arrangement.

* * * * *